United States Patent [19]

Chang

[11] Patent Number: 5,238,892
[45] Date of Patent: Aug. 24, 1993

[54] SUPPORTED CATALYST FOR 1-OLEFIN(S) (CO)POLYMERIZATION

[75] Inventor: Main Chang, Houston, Tex.

[73] Assignee: Exxon Chemical Patents Inc., Linden, N.J.

[21] Appl. No.: 898,255

[22] Filed: Jun. 15, 1992

[51] Int. Cl.$^5$ ............................................. C08F 4/656
[52] U.S. Cl. .................................... 502/111; 502/104; 502/107; 502/103; 502/117; 502/120; 526/129
[58] Field of Search ............... 502/103, 104, 107, 111, 502/117, 120

[56] References Cited

U.S. PATENT DOCUMENTS

| | | | |
|---|---|---|---|
| 4,808,561 | 2/1989 | Welborn | 502/104 |
| 4,912,075 | 3/1990 | Chang | 502/107 |
| 4,925,821 | 5/1990 | Chang | 502/107 |
| 4,935,397 | 6/1990 | Chang | 502/117 |

Primary Examiner—Patrick P. Garvin
Attorney, Agent, or Firm—Jaimes Sher

[57] ABSTRACT

This invention relates to a supported catalyst composition useful in the polymerization of olefins and to a method for its production. The invention particularly relates to the use of undehydrated silica gel containing from about 6 to about 20 percent by weight adsorbed water as the catalyst support material. The catalyst is formed by first reacting a trialkylaluminum compound with a metallocene, and subsequently reacting the resulting material with the undehydrated silica gel. The resulting supported metallocene-alumoxane catalyst has a level of activity comparable to that of conventionally made supported catalysts which are achieved at active metal loadings which are reduced from the loadings used in the previously known metallocene-alumoxane catalysts by at least 20%, and preferably 50%.

19 Claims, No Drawings

SUPPORTED CATALYST FOR 1-OLEFIN(S) (CO)POLYMERIZATION

FIELD OF INVENTION

This invention relates to a process for preparing a supported metallocene-alumoxane catalyst for use in the gas phase, slurry phase or liquid/solution phase polymerization of olefins. The invention particularly relates to the pre-reaction of metallocene with trialkylaluminum followed by the treatment of a catalyst support material.

BACKGROUND OF THE INVENTION

Olefin polymerization catalysts comprising a metallocene and an aluminum alkyl component were first proposed in about 1956. Australian patent 2436/88 proposed for use as a polymerization catalyst a bis-(cyclopentadienyl) titanium, zirconium, or vanadium salt as reacted with a variety of halogenated or unhalogenated aluminum alkyl compounds. Although some of these were capable of catalyzing the polymerization of ethylene, such catalytic complexes, especially those made by reaction with a trialkyl aluminum, had an insufficient level of catalytic activity to be employed commercially for production of polyethylene or copolymers of ethylene.

Later it was found that certain metallocenes such as bis-(cyclopentadienyl) titanium, or zirconium dialkyls in combination with aluminum alkyl/water cocatalyst formed catalyst systems for the polymerization of ethylene. Such catalysts are discussed in German Patent DE 2,608,863 published Sep. 9, 1977 which discloses a polymerization catalyst for ethylene consisting of bis-(cyclopentadienyl) titanium dialkyl, trialkylaluminum and water. German Patent DE 2,608,933 published Sep. 9, 1977 discloses an ethylene polymerization catalyst consisting of a cyclopentadienyl zirconium salt, a trialkylaluminum cocatalyst and water. European Patent Application No. 0035242 published Sep. 9, 1991 discloses a process for preparing ethylene and atactic propylene polymers in the presence of a cyclopentadienyl transition metal salt and an alumoxane. Such catalysts have sufficient activity to be commercially useful and enable the control of polyolefin molecular weight by means other than hydrogen addition—such as by controlling the reaction temperature or by controlling the amount of cocatalyst alumoxane as such or as produced by the reaction of water with an aluminum alkyl.

To realize the benefits of such catalyst systems, one must use or produce the required alumoxane cocatalyst component. An alumoxane is produced by the reaction of an aluminum alkyl with water. The reaction of an aluminum alkyl with water is very rapid, highly exothermic and pyrophoric in nature. Alumoxanes may be prepared by adding an extremely finely divided water, such as in the form of a humid solvent, to a solution of aluminum alkyl in benzene or other aromatic hydrocarbons. The production of an alumoxane by such procedure requires use of explosion-proof equipment and very close control of the reaction conditions in order to reduce potential fire and explosion hazards. For this reason, it has been preferred to produce alumoxane by reacting an aluminum alkyl with a hydrated salt, such as hydrated copper sulfate. In such a procedure a slurry of finely divided copper sulfate pentahydrate and toluene is formed and mantled under an inert gas. Aluminum alkyl is then slowly added to the slurry with stirring and the reaction mixture is maintained at room temperature for 24 to 48 hours during which a slow hydrolysis occurs by which alumoxane is produced. Although the production of alumoxane by a hydrated salt method significantly reduces the explosion and fire hazard inherent in the wet solvent production method, production of an alumoxane by reaction with a hydrated salt must be carried out as a process separate from that of producing the metallocene-alumoxane catalyst itself, is slow, and produces hazardous wastes that create disposal problems. Further, before the alumoxane can be used for the production of the an active catalyst complex the hydrated salt reagent must be separated from the alumoxane to prevent it from becoming entrained in the catalyst complex and thus contaminating any polymer produced therewith.

For many applications, such as gas phase polymerizations, it is desirable to have a supported catalyst. Supported metallocene-alumoxane catalysts have heretofore been produced by first adding the alumoxane to the support and then allowing the support to react with the metallocene. In copending applications U.S. Pat. Nos. 4,925,821 and 5,008,228 fully incorporated herein by reference disclose methods which are safer and more convenient for producing supported alumoxane metallocene catalyst. The methods disclosed in these U.S. patents provide catalysts which can be economically employed in a polymerization process. U.S. Pat. No. 4,925,821 describes a method of adding an undehydrated silica or U.S. Pat. No. 5,008,228 describes a method of adding a wet silica to a trialkylaluminum in a hydrocarbon solution. In each of these methods alumoxane is formed directly on the silica support in a safe and convenient manner. Thereafter, the catalyst is formed by depositing a metallocene on the alumoxane-containing support to yield a supported metallocene-alumoxane catalyst. The supported catalysts formed by such methods are highly active at conventionally utilized transition metal loading levels.

It is desirable to devise an economical procedure whereby a highly active supported metallocene-alumoxane catalyst could be safely produced for use as a gas phase or a slurry phase or a liquid phase polymerization catalyst. To be most economical, the procedure should not require the separate production of alumoxane.

Not only must the procedure be economical, but it is desirable to reduce the transition metal and/or aluminum content of the supported catalyst to as low a level as possible consistent with the level of activity needed for commercial viability. Reducing the transition metal and/or aluminum requirements decreases the raw material costs. In addition, the reduction in the level of the transition metal and/or aluminum serves to reduce the level of those catalytic metal constituents remaining in the polymer product as residue or ash. Where the transition metal and aluminum residue in the polymer exceeds about 1000 ppm, it is generally necessary to treat the polymer in a subsequent and expensive deashing step. In some applications, such as certain medical uses and in use in certain radiation environments, the presence of even very small quantities of transition metal and/or aluminum, which may leach out, could present a health problem. Therefore, it is desirable, in those applications, to have sufficiently low levels of the transition metal and/or aluminum, with or without deashing, to allow the polymers to be used in such applications.

Accordingly, there has been a continuing need in the art to discover catalysts of higher activity, specifically, in the context of supported catalysts. It has been a continuing desire to discover a catalyst which has a commercially useful rate of activity at the lowest loadings of active metals.

SUMMARY OF THE INVENTION

This invention is of a supported catalyst composition, a method for its production and a process for polymerizing olefins in the presence of the support catalyst composition. A supported metallocene-alumoxane catalyst composition has been discovered which has a level of polymerization activity at least comparable to that of conventionally made supported catalysts but at active metal loadings which are lower than used in previously known supported metallocene-alumoxane catalysts by at least 20% to 80%, and preferably 40% to 70%. The invention relates to the pre-reaction of a metallocene with an aluminum alkyl followed by the treatment of a catalyst support material containing adsorbed water to form a supported catalyst. Specifically, the invention discloses a supported metallocene catalyst and a method for making said catalyst which, at transition metal loadings of from about 0.001 to about 100 mmole per gram of support, has substantially higher activity than has heretofore been possible with supported metallocene-alumoxane catalysts of comparable transition metal loadings.

DETAILED DESCRIPTION OF THE INVENTION

The supported catalyst of this invention generally comprises a solid product produced by mixing and reacting a metallocene and a aluminum alkyl compound, for example trialkylaluminum, in a hydrocarbon solvent to form a reaction product, and thereafter, adding an undehydrated support material, such as silica gel containing from about 6 to 20 percent by weight of adsorbed water, to the reaction mixture. The amount of undehydrated silica used is at least 20 grams of silica per millimole of transition metal present in such reaction mixture.

The present invention is directed towards a method for preparing a supported catalyst system for use in a gas phase, liquid/solution phase, slurry phase polymerization process of olefins and these processes are in no way intended to be limited by either temperature or pressure.

The supported catalyst is particularly useful for the gas phase polymerization of ethylene to high molecular weight polyethylenes such as linear low density polyethylene (LLDPE) and high density polyethylene (HDPE). The polymers are intended for fabrication into articles by extrusion, injection molding, thermoforming, rotational molding, and the like. In particular, the polymers prepared with the catalyst complex and by the method of this invention are homopolymers of ethylene and copolymers of ethylene with higher alpha-olefins having from 3 to about 20 carbon atoms and preferably 3 to 8 carbon atoms. Illustrative of the higher alpha-olefins are butene-1, hexene-1, octene-1, 1-decene, 1-dodecene, 1-tetradecene, 1-hexadecene, 1-octadecene, 1-eicesene and 4-methyl-1-pentene.

In the process of the present invention, ethylene, either alone or together with alpha-olefins having three or more carbon atoms, is polymerized in the presence of a silica gel supported catalyst system comprising at least one metallocene and an alumoxane. In accordance with this invention, one can also produce olefin copolymers, particularly copolymers of ethylene and higher alpha-olefins having from 3-20 carbon atoms.

The active catalyst complex prepared by the process of this invention comprises a metallocene and an alumoxane formed onto the surface of a silica gel support material. Alumoxanes are oligomeric aluminum compounds represented by the general formula (R—Al—O)$_y$ which is believed to be a cyclic compound and R(R—Al—O—)$_y$AlR, which is a linear compound. In the general formula, "R" is an alkyl group such as, for example, methyl, ethyl, propyl, butyl, and pentyl and "y" is an integer from 2 to about 30, preferably 6 to about 30, and represents the degree of oligomerization of the alumoxane. In the preparation of alumoxanes from, for example, the reaction of trimethylalumium and water, a mixture of linear and cyclic compounds is obtained. Generally, an alumoxane having a higher degree of oligomerization will, for a given metallocene, produce a catalyst complex of higher activity than will an alumoxane having a lower degree of oligomerization.

The metallocene may be any of the organometallic coordination compounds obtained as a cyclopentadienyl derivative of a transition metal of the Periodic Table of Elements. Metallocenes which are useful for preparing an active catalytic complex according to the process of this invention are the mono-, bis- and tri-cyclopentadienyl or substituted cyclopentadienyl metal compounds and most preferably, bis-cyclopentadienyl compounds. The metallocenes particularly useful in this invention are represented by the general formulas:

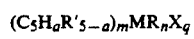

$$(C_5H_aR'_{5-a})_mMR_nX_q \qquad I.$$

wherein each R' is the same or different and a hydrocarbyl group having from 1 to 20 carbon atoms, M is a Group 4b, 5b or 6b transition metal, preferably a Group 4b transition metal, R is a hydrocarbyl group or hydrocarboxy group having from 1 to 20 carbon atoms, X is a halogen, "a" is a whole number from 0 to 5 and "m" is a whole number from 1 to 3, "n" is a whole number from 0 to 3, and "q" is a whole number from 0 to 3;

$$(C_5H_bR'_{4-b})_2R''_sMQ_g \qquad II.$$

or

$$(C_5H_bR'_{4-b})_2R''_sMQ' \qquad III.$$

wherein each R' is the same or different and is hydrogen or a hydrocarbyl radical such as alkyl, alkenyl, aryl, alkylaryl, or arylalkyl radicals containing from 1 to 20 carbon atoms, a silicon-containing hydrocarbyl radical, R" is C—C alkylene radical, a dialkyl germanium or silicone, or an alkyl phosphine or amine radical bridging two (C$_5$) rings, Q is a hydrocarbyl radical, such as aryl, alkyl, alkenyl, alkylaryl, or arylalkyl having 1-20 carbon atoms, hydrocarboxy radical having 1-20 carbon atoms or halogen and can be the same or different, Q' is an alkylidene radical having from 1 to about 20 carbon atoms, "b" is a whole number from 0 to 4, "s" is 0 or 1, "g" is a whole number from 0 to 3 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals is methylidene, ethylidene and propylidene.

Of the metallocenes, hafnocene, zirconocenes and titanocenes are most preferred. Illustrative but non-limiting examples of the metallocenes which can be usefully employed in accordance with this invention are monocyclopentadienyl titanocenes such as, cyclopentadienyl titanium trichloride, pentamethylcyclopentadienyl titaniumtrichloride; bis(cyclopentadienyl) titanium diphenyl; the carbene represented by the formula $Cp_2Ti=CH_2.Al(CH_3)_2Cl$ and derivatives of this reagent such as $Cp_2Ti=CH_2.Al(CH_3)_3$, $(Cp_2TiCH)_2$, $Cp_2TiCH_2CH(CH_3)CH_2$, $Cp_2Ti=CHCH_2CH_2$, $Cp_2Ti=CH_2.AlR'''_2Cl$, wherein Cp is a cyclopentadienyl or substituted cyclopentadienyl radical, and R''' is an alkyl, aryl, or alkylaryl radical having from 1–18 carbon atoms; substituted bis(Cp)Ti(IV) compounds such as bis(indenyl)Ti diphenyl or dichloride, bis(methylcyclopentadienyl)Ti diphenyl or dihalides and other dihalide complexes; dialkyl, trialkyl, tetra-alkyl and penta-alkyl cyclopentadienyl titanium compounds such as bis(1,2-dimethylcyclopentadienyl)Ti diphenyl or dichloride, bis(1,2-diethylcyclopentadienyl)Ti diphenyl or dichloride and other dihalide complexes; silicone, phosphine, amine or carbon bridged cyclopentadiene complexes, such as dimethyl silyldicyclopentadienyl titanium diphenyl or dichloride, methylenedicyclo-pentadienyl titanium diphenyl or dichloride and other dihalide complexes and the like.

Illustrative but non-limiting examples of the zirconocenes which can be usefully employed in accordance with this invention are, cyclopentadienyl zirconium trichloride, pentamethylcyclopentadienyl zirconium trichloride, bis(cyclopentadienyl)zirconium diphenyl, bis(cyclopentadienyl)zirconium dichloride, the alkyl substituted cyclopentadienes, such as bis(ethyl cyclopentadienyl)zirconium dimethyl, bis(-phenylpropylcyclopentadienyl)zirconium dimethyl, bis(methylcyclopentadienyl)zirconium dimethyl, and dihalide complexes of the above; di-alkyl, tri-alkyl, tetra-alkyl, and penta-alkyl cyclopentadienes, such as bis(pentamethyl-cyclopentadienyl)zirconium dimethyl, bis(1,2-dimethyl-cyclopentadienyl)zirconium dimethyl, bis(1,3-diethyl-cyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae $Cp_2Zr=CH_2P(C_6H_5)_2CH_3$, and derivatives of these compounds such as $Cp_2ZrCH_2CH(CH_3)CH_2$.

Bis(cyclopentadienyl)hafnium dichloride, bis(cyclopentadienyl)hafnium dimethyl, bis(cyclopentadienyl)vanadium dichloride and the like are illustrative of other metallocenes.

Generally the use of a metallocene which comprises a bis(substituted cyclopentadienyl) zirconium will provide a catalyst complex of higher activity than a corresponding titanocene or a monocyclopentadienyl metal compound. Hence bis(substituted cyclopentadienyl) zirconium compounds are preferred for use as the metallocene.

The preferred trialkylaluminum is trimethylaluminum followed in order of preference is triethylaluminum.

Also suitable for use as the trialkylaluminum are tripropylalumiuum, tri-n-butylaluminum tri-isobutylaluminum, tri(2-methylpentyl)aluminum, trihexylaluminum, tri-n-octylaluminum, and tri-n-decylaluminum. Although such trialkylaluminum compounds are ineffective when used to form an alumoxane cocatalyst separately from the silica gel support material, when reacted with an undehydrated silica gel in accordance with the procedure of the invention an effective metallocene-alumoxane reaction product component is formed on the silica gel particle.

The solvents used in the preparation of the catalyst system are inert hydrocarbons, in particular, a hydrocarbon that is inert with respect to the catalyst system. Such solvents are well known and include, for example, isobutane, butane, pentane, isopentane, hexane, isohexane, heptane, octane, cyclohexane, methylcyclohexane, toluene, xylene and the like. Most preferred are heptane, isopentane and toluene.

The process of this invention utilizes as the catalyst support material silica particles having a surface area in the range of about 10 $m^2/g$ to about 700 $m^2/g$, preferably about 100–500 $m^2/g$ and desirably about 200–400 $m^2/g$, a pore volume of about 3 to about 0.5 cc/g and preferably 2–1 cc/g and an adsorbed water content of from about 6 to about 20 weight percent, preferably from about 7 to about 15 weight percent. Such silica particles are referred to throughout as an "undehydrated" silica gel. The average particle site (APS) of the silica may be from $0.3\mu$ to about $100\mu$, and for a gas phase catalyst preferably from about $30\mu$ to about $90\mu$ ($1\mu = 10^{-6}$m). For a catalyst intended for high pressure single phase polymerization, the particle size of the silica should preferably range from about $0.3\mu$ to no greater than about $10\mu$.

REFERENTIAL EXAMPLES

In order to provide a better understanding of the present invention including representative advantages and limitations thereof, the following referential examples are offered as related to actual tests performed in the practice of this invention, and illustrate the suprising high catalyst activity at extremely low loading levels of active metals.

The supported metallocene-alumoxane catalysts are prepared by reacting a metallocene compound and a trialkylaluminum compound in a hydrocarbon solvent. To facilitate the mixing, the metallocene is partially dissolved in a small amount of the hydrocarbon solvent prior to its introduction into the hydrocarbon solvent containing the trialkylaluminum. Sufficient solvent is used so as to facilitate the proper mixing of the reactants. The mixing of the metallocene and the trialkylaluminum is facilitated by mechanical stirring so as to render the mixture homogeneous. The desired interaction between the metallocene and the trialkylaluminum takes place quickly. Typically, about one hour of contact with stirring is adequate. Next, a quantity of undehydrated silica is added to the mixture. The addition is carried out slowly and is followed by stirring, while the stirring is continued for a period of about one hour.

Both mixing steps can conveniently be allowed to take place at room temperature. If desired, the steps can be made to take place at lower or higher temperatures.

Temperatures as low as −10° C. or as high as 70° C. can be used.

The solvent is thereafter removed by heating the mixture to some convenient temperature, such as 65° C., while purging the mixture with nitrogen. Removal of most of the solvent leaves a solid which can be further dried under vacuum to form free-flowing powder. The free-flowing powder comprises a silica gel supported metallocene-alumoxane catalyst complex of sufficiently high catalyst activity for use in the polymerization of olefins by conventional gas phase or high pressure single phase polymerization procedures.

The resulting supported metallocene-alumoxane catalysts have an aluminum to Group 4b transition metal ratio of from about 100,000 to about 100, preferably from about 1,000 to about 120, more preferably from about 300 to about 130. The catalyst has a ratio of water to a trialkylalumunum of of from about 1:1.5 to about 1.5:1, preferably from about 1:1.2 to about 1.2:1. The catalyst has a weight ratio of Group 4b transition metal to dry support material of of from about 1:10,000 to about 1:500, preferably from about 1:1,000 to about 1:500 and most preferably from about 1:10,000 to about 1:300 and even more preferably from about 1:1,000 to about 1:300.

EXAMPLE 1

A 200 ml quantity of dried and degassed heptane was charged in a one liter three-neck flask equipped with a magnetic stirring bar. A mixture of 220 ml of trimethylaluminum (TMA) in heptane (14%) was then charged into the flask to form a clear solution.

A 1.25 g quantity of di-(n-butylcyclopentadienyl) zirconium dichloride partially dissolved in 50 ml of heptane was added to the flask and the mixture was allowed to mix at ambient temperature for one hour.

A 50 g quantity of "undehydrated" silica gel (Davison 948) containing 12.3 wt % water was slowly added to the flask. After the addition was completed, the mixture was stirred at ambient temperature for one hour.

The mixture in the flask was heated to 65° C. in an oil bath while nitrogen gas was purged through the flask to remove the solvent. The heating and nitrogen purging were stopped when the mixture in the flask turned into solid form. The mixture was then dried under vacuum to form a free-flowing powder.

EXAMPLE 2

The procedure of Example 1 was followed except that only 1.0 g of di-(n-butylcyclopentadienyl) zirconium dichloride was used.

EXAMPLE 3

The procedure of Example 1 was followed except that only 0.8 g of di-(n-butylcyclopentadienyl) zirconium dichloride was used.

EXAMPLE 4

The procedure of Example 1 was followed except that only 0.6 g of di-(n-butycyclopentadienyl) zirconium dichloride was used.

EXAMPLE 5

The procedure of Example 1 was followed except that only 0.4 g of di-(n-butylcyclopentadienyl)zirconium dichloride was used.

EXAMPLE 6

The procedure of Example 1 was followed except that only 0.2 g of di-(n-butylcyclopentadienyl)zirconium dichloride was used.

COMPARATIVE EXAMPLE 7

A 200 ml quantity of dried and degassed heptane was charged in a one liter three-neck flask equipped with a magnetic stirring bar. A mixture of 220 ml of trimethylaluminum (TMA) in heptane (1.4M) was then charged into the flask to form a clear solution.

A 50 g quantity of "undehydrated" silica gel (Davison 948) containing 12.3 wt % water was slowly added to the flask. After the addition was completed, the mixture was stirred at ambient temperature for one hour.

A 1.25 g quantity of di-(n-butylcyclopentadienyl) zirconium dichloride partially dissolved in 30 ml of heptane was added to the flask and the mixture was allowed to react at ambient temperature for 30 minutes.

The mixture in the flask was heated to 65° C. in an oil bath while nitrogen gas was purged through the flask to remove the solvent. The heating and nitrogen purging were stopped when the mixture in the flask turned into solid form. The mixture was then dried under vacuum to form a free-flowing powder.

COMPARATIVE EXAMPLE 8

The procedure of Comparative Example 9 was followed except that only 1.0 g of di-(n-butylcyclopentadienyl) zirconium dichloride was used.

COMPARATIVE EXAMPLE 9

The procedure of Comparative Example 9 was followed except that only 0.8 g of di-(n-butylcyclopentadienyl) zirconium dichloride was used.

COMPARATIVE EXAMPLE 10

The procedure of Comparative Example 9 was followed except that only 0.6 g of di-(n-butylcyclopentadienyl) zirconium dichloride was used.

POLYMERIZATIONS

The activity of the catalyst powders formed in Examples 1–6 and Comparative Examples 7–10 were determined at ambient temperature and 5 psig ethylene pressure by the following procedure. A 150 ml vial was freshly cleaned, heated to 130° C. for 6 hours, cooled to room temperature and flushed with nitrogen for 10 minutes. The vial was provided with a magnetic stirring bar and 2.0 g of catalyst was charged into the vial. At ambient temperature ethylene was fed into the vial and an ethylene pressure of 5 psig was maintained for 30 minutes. Thereafter, ethylene gas was vented from the vial and the polyethylene formed inside the vial was collected and weighed. The polyethylene yields obtained using each of the catalysts formed in Examples 1–10 are shown in Table 1. As Table 1 shows, while the yield at the higher Zr loading (Example 1 and Comparative Example 7) was not favorably affected by the procedure of this invention, at lower Zr loadings, where the ratio of silica to Zr was about 20 g $SiO_2$ per mmole Zr and above (Examples 2–4 and Comparative Examples 7–10) the yield of the catalyst of this invention was far more active than the corresponding catalyst formed by previously known means.

TABLE 1

| Catalyst (Example #) | Zirconium Loading (mmole Zr/g SiO$_2$) | Al/Zr Ratio | PE Formed (g) |
|---|---|---|---|
| 1 | 0.061 | 99 | 9.2 |
| 2 | 0.049 | 124 | >9.7 |
| 3 | 0.039 | 155 | >9.7 |
| 4 | 0.029 | 208 | >9.7 |
| 5 | 0.019 | 311 | >9.7 |
| 6 | 0.009 | 628 | 3.5 |
| 7 (Comparative) | 0.061 | 99 | 9.7 |
| 8 (Comparative) | 0.049 | 124 | 9.0 |
| 9 (Comparative) | 0.039 | 155 | 1.9 |
| 10 (Comparative) | 0.029 | 208 | 1.9 |

While the present invention has been described and illustrated by reference to particular embodiments thereof, it will be appreciated by those of ordinary skill in the art that the invention lends itself to variations not necessarily illustrated herein. For this reason, then, reference should be made solely to the appended claims for purposes of determining the true scope of the present invention.

$$(C_5H_bR'_{4-b})_2R''_2MQ_g \qquad \text{(II)}.$$
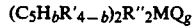

or $$(C_5H_bR'_{4-b})_2R''_sMQ' \qquad \text{III.}$$
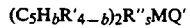

What is claimed is:

1. A supported catalyst comprising a solid product produced by treating an undehydrated support material with a hydrocarbon solution in which a transition metal metallocene and trialkylaluminum compound have been reacted, and said solid product having at least 20 grams of undehydrated support material per millimole of transition metal.

2. The supported catalyst in accordance with claim 1 which upon substantially complete separation from said hydrocarbon solvent further comprises a free-flowing powder.

3. The supported catalyst in accordance with claim 1 wherein said transition metal metallocene is present in the hydrocarbon solvent in a quantity relative to said trialkylaluminum compound to provide an atomic ratio of aluminum to transition metal of from about 130 to about 1000.

4. The supported catalyst in accordance with claim 1 wherein said transition metal metallocene is of the formulas:

$$(C_5H_aR'_{5-a})_mMR_nX_q \qquad \text{I.}$$
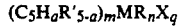

wherein each R' is the same or different and a hydrocarbyl group having from 1 to 20 carbon atoms, M is a Group 4b, 5b or 6b transition metal, R is a hydrocarbyl group or hydrocarboxy group having from 1 to 20 carbon atoms, X is a halogen, "a" is a whole number from 0 to 5 and "m" is a whole number from 1 to 3, "n" is a whole number from 0 to 3, and "q" is a whole number from 0 to 3;

$$(C_5H_bR'_{4-b})_2R''_sMQ_g \qquad \text{II}$$
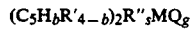

or $$(C_5H_bR'_{4-b})_2R''_sMQ' \qquad \text{III.}$$
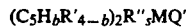

wherein each R' is the same or different and is hydrogen or a hydrocarbyl radical containing from 1 to 20 carbon atoms, a silicon-containing hydrocarbyl radical, R'' is C—C alkylene radical, a germanium or silicon containing radical, or a phosphine or amine radical bridging two (C$_5$) rings, Q is a hydrocarbyl radical having 1-20 carbon atoms, hydrocarboxy radical having 1-20 carbon atoms or halogen and can be the same or different, Q' is an alkylidene radical having from 1 to about 20 carbon atoms, "b" is a whole number from 0 to 4, "s" is 0 or 1, "g" is a whole number from 0 to 3 and M is as defined above.

5. The supported catalyst in accordance with claim 1 wherein said trialkylaluminum selected from the group consisting of trimethylaluminum, triethylaluminum, tripropylaluminum, tri-n-butylaluminum tri-isobutylaluminum, tri(2-methylpentyl)aluminum, trihexylaluminum, tri-n-octylaluminum, and tri-n-decylaluminum.

6. The supported catalyst in accordance with claim 1 wherein said undehydrated support material is undehydrated silica.

7. The supported catalyst in accordance with claim 6 wherein said undehydrated silica having a water content of from about 6 to about 20 percent by weight.

8. The supported catalyst in accordance with claim 7 wherein said undehydrated silica is added in a quantity such that the water content provides a molar ratio of water to trialkylaluminum of from at least about 1.2 to 0.8.

9. The supported catalyst in accordance with claim 1 wherein the trialkylaluminum is trimethylaluminum.

10. The supported catalyst in accordance with claim 4 wherein said undehydrated support material is added in amount of at least 30 grams of undehydrated support material per millimole of transition metal.

11. A method for making a supported metallocene-alumoxane catalyst composition, comprising the steps of:

reacting a transition metal metallocene and a trialkylaluminum compound in homogeneous solution in a hydrocarbon solvent, and adding an undehydrated support material to said homogeneous solution in an amount of at least about 20 grams of undehydrated support material per millimole of transition metal placed in said metallocene-alumoxane catalyst composition.

12. The method in accordance with claim 11, further comprising the step of separating said hydrocarbon solvent from said supported metallocene-alumoxane catalyst composition to render said supported metallocene-alumoxane composition a free-flowing powder.

13. The method in accordance with claim 11, wherein said metallocene is added to said hydrocarbon solvent in an amount relative to said trialkylaluminum compound to provide an atomic ratio of aluminum to transition metal of from about 100 to about 1000.

14. The method in accordance with claim 11, wherein said metallocene is of the formulas:

$$(C_5H_aR'_{5-a})_mMR_nX_q \qquad \text{I.}$$
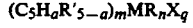

wherein each R' is the same or different and a hydrocarbyl group having from 1 to 20 carbon atoms, M is a Group 4b, 5b or 6b transition metal, R is a hydrocarbyl group or hydrocarboxy group having from 1 to 20 carbon atoms, X is a halogen, "a" is a whole number from 0 to 5 and "m" is a whole number from 1 to 3, "n" is a whole number from 0 to 3, and "q" is a whole number from 0 to 3;